(12) United States Patent
Mitchell et al.

(10) Patent No.: US 7,935,155 B2
(45) Date of Patent: May 3, 2011

(54) METHOD OF MANUFACTURING AN ELECTRODE OR CAPACITOR PRODUCT

(75) Inventors: Porter Mitchell, San Diego, CA (US); Xiaomei Xi, Carlsbad, CA (US); Linda Zhong, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 86 days.

(21) Appl. No.: 12/122,383

(22) Filed: May 16, 2008

(65) Prior Publication Data
US 2008/0266753 A1 Oct. 30, 2008

Related U.S. Application Data (62) Division of application No. 10/900,824, filed on Jul. 28, 2004, now Pat. No. 7,384,433.

(60) Provisional application No. 60/578,722, filed on Jun. 10, 2004, provisional application No. 60/557,576, filed on Mar. 30, 2004, provisional application No. 60/546,093, filed on Feb. 19, 2004.

(51) Int. Cl.
*H01M 6/00* (2006.01)
*H01M 4/82* (2006.01)
(52) U.S. Cl. ............. 29/623.3; 29/25.41; 29/25.01; 361/505; 361/517; 156/306.3
(58) Field of Classification Search ...... 29/623.3–623.5, 29/825–830, 25.35–25.42, 592.1, 594, 25.01–25.03; 429/212, 249; 361/301.3, 535, 502–503; 361/514–518; 156/306.3
See application file for complete search history.

(56) References Cited

U.S. PATENT DOCUMENTS 2,692,210 A 10/1954 Burnham
(Continued)

FOREIGN PATENT DOCUMENTS

EP 0617441 9/1994
(Continued)

OTHER PUBLICATIONS

U.S. Appl. No. 11/251,512, filed Oct. 14, 2005.

*Primary Examiner* — Minh Trinh
(74) *Attorney, Agent, or Firm* — Oppedahl Patent Law Firm LLC (57) ABSTRACT

A method of manufacturing an electrode product where a compressible and deformable layer is densified and laminated to a layer of a material that is relatively resistant to stretching. The densification and bonding take place in a single step. A method as used in fabrication of electrodes, for example, electrodes for double layer capacitors, a deformable and compressible active electrode film is manufactured from activated carbon, conductive carbon, and a polymer. The electrode film may be bonded directly to a collector. Alternatively, a collector may be coated with a wet adhesive layer. The adhesive layer is subsequently dried onto the foil. The dried adhesive and foil combination may be manufactured as a product for later sale or use, and may be stored as such on a storage roll or other storage device. The active electrode film is overlayed on the metal foil, and processed in a laminating device, such as a calender. Lamination both densifies the active electrode film and bonds the film to the metal foil. Spreading of the active electrode film in the plane parallel to the plane of the metal foil is reduced or eliminated during lamination, because of the adhesion between the film and the foil.

20 Claims, 2 Drawing Sheets

U.S. PATENT DOCUMENTS

| | | | |
|---|---|---|---|
| 3,528,955 A | 9/1970 | Lippman et al. |
| 3,864,124 A | 2/1975 | Breton et al. |
| 4,129,633 A | 12/1978 | Biddick |
| 4,153,661 A | 5/1979 | Ree et al. |
| 4,175,055 A | 11/1979 | Goller et al. |
| 4,177,159 A | 12/1979 | Singer |
| 4,194,040 A | 3/1980 | Breton et al. |
| 4,287,232 A | 9/1981 | Goller et al. |
| 4,313,972 A | 2/1982 | Goller et al. |
| 4,317,789 A | 3/1982 | Groult et al. |
| 4,320,184 A | 3/1982 | Bernstein et al. |
| 4,320,185 A | 3/1982 | Bernstein et al. |
| 4,336,217 A | 6/1982 | Sauer |
| 4,354,958 A | 10/1982 | Solomon |
| 4,379,772 A | 4/1983 | Solomon et al. |
| 4,383,010 A | 5/1983 | Spaepen |
| 4,482,931 A | 11/1984 | Yializis |
| 4,500,647 A | 2/1985 | Solomon et al. |
| 4,556,618 A | 12/1985 | Shia |
| 4,737,889 A | 4/1988 | Nishino et al. |
| 4,758,473 A | 7/1988 | Herscovici et al. |
| 4,822,701 A | 4/1989 | Ballard et al. |
| 4,877,694 A | 10/1989 | Solomon et al. |
| 4,895,775 A | 1/1990 | Kato et al. |
| 4,917,309 A | 4/1990 | Zander et al. |
| 4,992,910 A | 2/1991 | Evans |
| 5,100,747 A | 3/1992 | Hayashida et al. |
| 5,136,474 A | 8/1992 | Sarangapani et al. |
| 5,144,595 A | 9/1992 | Graham et al. |
| 5,150,283 A | 9/1992 | Yoshida et al. |
| 5,162,178 A | 11/1992 | Ohsawa et al. |
| 5,168,019 A | 12/1992 | Sugeno |
| 5,198,313 A | 3/1993 | Juergens |
| 5,214,564 A | 5/1993 | Metzler et al. |
| 5,381,303 A | 1/1995 | Yoshida et al. |
| 5,393,617 A | 2/1995 | Klein |
| 5,436,093 A | 7/1995 | Huang et al. |
| 5,450,279 A | 9/1995 | Yoshida et al. |
| 5,456,000 A | 10/1995 | Gozdz et al. |
| 5,470,357 A | 11/1995 | Schmutz et al. |
| 5,478,363 A | 12/1995 | Klein |
| 5,478,668 A | 12/1995 | Gozdz et al. |
| 5,482,906 A | 1/1996 | Sakai et al. |
| 5,557,497 A | 9/1996 | Ivanov et al. |
| 5,593,462 A | 1/1997 | Gueguen et al. |
| 5,621,607 A | 4/1997 | Farahmandi et al. |
| 5,636,437 A | 6/1997 | Kaschmitter et al. |
| 5,675,553 A | 10/1997 | O'Brien et al. |
| 5,682,288 A | 10/1997 | Wani |
| 5,698,342 A | 12/1997 | Klein |
| 5,703,906 A | 12/1997 | O'Brien et al. |
| 5,706,165 A | 1/1998 | Saito et al. |
| 5,707,763 A | 1/1998 | Shimizu et al. |
| 5,720,780 A | 2/1998 | Liu et al. |
| 5,757,675 A | 5/1998 | O'Brien |
| 5,778,515 A | 7/1998 | Menon |
| 5,781,460 A | 7/1998 | Nguyen et al. |
| 5,786,555 A | 7/1998 | Saito et al. |
| 5,786,980 A | 7/1998 | Evans |
| 5,840,087 A | 11/1998 | Gozdz et al. |
| 5,846,675 A | 12/1998 | Sazhin et al. |
| 5,849,431 A | 12/1998 | Kita et al. |
| 5,879,836 A | 3/1999 | Ikeda et al. |
| 5,914,019 A | 6/1999 | Dodgson et al. |
| 5,955,215 A | 9/1999 | Kurzweil et al. |
| 5,966,414 A | 10/1999 | O'Brien et al. |
| 5,973,912 A | 10/1999 | Kibi et al. |
| 6,022,436 A | 2/2000 | Koslow et al. |
| 6,024,773 A | 2/2000 | Inuzuka et al. |
| 6,031,712 A | 2/2000 | Kurihara et al. |
| 6,072,692 A | 6/2000 | Hiratsuka et al. |
| 6,094,338 A | 7/2000 | Hirahara et al. |
| 6,110,335 A | 8/2000 | Avarbz et al. |
| 6,114,835 A | 9/2000 | Price |
| 6,127,474 A | 10/2000 | Andelman |
| 6,134,760 A | 10/2000 | Mushiake et al. |
| 6,159,611 A | 12/2000 | Lee et al. |
| 6,181,545 B1 | 1/2001 | Amatucci et al. |
| 6,187,061 B1 | 2/2001 | Amatucci et al. |
| 6,207,251 B1 | 3/2001 | Balsimo et al. |
| 6,222,715 B1 | 4/2001 | Gruhn |
| 6,225,733 B1 | 5/2001 | Gadkaree et al. |
| 6,236,560 B1 | 5/2001 | Ikeda et al. |
| 6,238,818 B1 | 5/2001 | Dalton |
| 6,245,464 B1 | 6/2001 | Spillman et al. |
| 6,246,568 B1 | 6/2001 | Nakao et al. |
| 6,259,595 B1 | 7/2001 | Hebel et al. |
| 6,262,360 B1 | 7/2001 | Michel |
| 6,301,092 B1 | 10/2001 | Hata et al. |
| 6,304,426 B1 | 10/2001 | Wei et al. |
| 6,308,405 B1 | 10/2001 | Takamatsu et al. |
| 6,310,756 B1 | 10/2001 | Miura et al. |
| 6,310,759 B2 | 10/2001 | Ishigaki et al. |
| 6,310,762 B1 | 10/2001 | Okamura et al. |
| 6,323,750 B1 | 11/2001 | Lampl et al. |
| 6,349,027 B1 | 2/2002 | Suhara et al. |
| 6,359,769 B1 | 3/2002 | Mushiake et al. |
| 6,377,441 B1 | 4/2002 | Ohya et al. |
| 6,397,274 B1 | 5/2002 | Miller |
| 6,403,257 B1 | 6/2002 | Christian et al. |
| 6,424,514 B1 | 7/2002 | Boy et al. |
| 6,447,669 B1 | 9/2002 | Lain |
| 6,452,782 B1 | 9/2002 | Otsuki et al. |
| 6,459,564 B1 | 10/2002 | Watanabe et al. |
| 6,466,516 B1 | 10/2002 | O'Brien et al. |
| 6,493,210 B2 | 12/2002 | Nonaka et al. |
| 6,558,835 B1 | 5/2003 | Kurisu et al. |
| 6,589,299 B2 | 7/2003 | Missling et al. |
| 6,614,646 B2 | 9/2003 | Bogaki et al. |
| 6,627,252 B1 | 9/2003 | Nanjundiah et al. |
| 6,645,664 B2 | 11/2003 | Nakanishi et al. |
| 6,677,078 B2 | 1/2004 | Reise et al. |
| 6,697,249 B2 | 2/2004 | Maletin et al. |
| 6,708,757 B2 | 3/2004 | Hebel et al. |
| 6,761,744 B1 | 7/2004 | Tsukamoto et al. |
| 6,768,056 B2 | 7/2004 | Fischer et al. |
| 6,795,297 B2 | 9/2004 | Iwaida et al. |
| 6,804,108 B2 | 10/2004 | Nanjundiah et al. |
| 6,808,845 B1 | 10/2004 | Nonaka et al. |
| 6,831,826 B2 | 12/2004 | Iwaida et al. |
| 6,841,594 B2 | 1/2005 | Jones et al. |
| 6,847,517 B2 | 1/2005 | Iwaida et al. |
| 6,906,911 B2 | 6/2005 | Ikeda et al. |
| 6,912,116 B2 | 6/2005 | Takahashi et al. |
| 6,914,768 B2 | 7/2005 | Matsumoto et al. |
| 6,918,991 B2 | 7/2005 | Chickering et al. |
| 7,018,568 B2 | 3/2006 | Tierney |
| 7,061,749 B2 | 6/2006 | Liu et al. |
| 7,090,946 B2 | 8/2006 | Mitchell et al. |
| 7,139,162 B2 | 11/2006 | Michel et al. |
| 7,199,997 B1 | 4/2007 | Lipka et al. |
| 7,227,737 B2 | 6/2007 | Mitchell et al. |
| 7,236,348 B2 | 6/2007 | Asano et al. |
| 7,295,423 B1 | 11/2007 | Mitchell et al. |
| 7,352,558 B2 | 4/2008 | Mitchell |
| 7,384,433 B2 * | 6/2008 | Mitchell et al. | 29/623.3 |
| 7,495,349 B2 | 2/2009 | Mitchell |
| 7,722,686 B2 | 5/2010 | Mitchell |
| 2001/0014420 A1 | 8/2001 | Takeuchi et al. |
| 2002/0008956 A1 | 1/2002 | Niu |
| 2002/0039275 A1 | 4/2002 | Takeuchi et al. |
| 2002/0096661 A1 | 7/2002 | Shinozaki et al. |
| 2002/0122985 A1 | 9/2002 | Sato et al. |
| 2002/0136948 A1 | 9/2002 | Missling et al. |
| 2002/0150812 A1 | 10/2002 | Kaz et al. |
| 2002/0163773 A1 | 11/2002 | Niiori et al. |
| 2002/0167784 A1 | 11/2002 | Takatomi et al. |
| 2002/0167785 A1 | 11/2002 | Kamath |
| 2003/0030963 A1 | 2/2003 | Tennent et al. |
| 2003/0113636 A1 | 6/2003 | Sano et al. |
| 2003/0157314 A1 | 8/2003 | Penneau et al. |
| 2003/0175494 A1 | 9/2003 | Penneau et al. |
| 2003/0180622 A1 | 9/2003 | Tsukuda et al. |
| 2003/0186110 A1 | 10/2003 | Sloop |
| 2005/0064289 A1 | 3/2005 | Suzuki et al. |
| 2005/0078432 A1 | 4/2005 | Gallay et al. |
| 2005/0186473 A1 | 8/2005 | Mitchell et al. |

| | | |
|---|---|---|
| 2005/0225929 A1 | 10/2005 | Murakami et al. |
| 2005/0250011 A1 | 11/2005 | Mitchell et al. |
| 2005/0266298 A1 | 12/2005 | Mitchell et al. |
| 2005/0266990 A1 | 12/2005 | Iwasaki et al. |
| 2005/0271798 A1 | 12/2005 | Zhong et al. |
| 2006/0035785 A1 | 2/2006 | Tanaka |
| 2006/0039100 A1 | 2/2006 | Asano et al. |
| 2006/0054277 A1 | 3/2006 | Byun et al. |
| 2006/0105624 A1 | 5/2006 | Yoshikane et al. |
| 2006/0109608 A1 | 5/2006 | Zhong et al. |
| 2006/0114643 A1 | 6/2006 | Mitchell et al. |
| 2006/0133012 A1 | 6/2006 | Zhong et al. |
| 2006/0133013 A1 | 6/2006 | Xi et al. |
| 2006/0137158 A1 | 6/2006 | Zou et al. |
| 2006/0143884 A1 | 7/2006 | Mitchell et al. |
| 2006/0146475 A1 | 7/2006 | Zhong et al. |
| 2006/0146479 A1 | 7/2006 | Mitchell et al. |
| 2006/0147712 A1 | 7/2006 | Mitchell et al. |
| 2006/0148191 A1 | 7/2006 | Mitchell et al. |
| 2006/0246343 A1 | 11/2006 | Mitchell et al. |
| 2007/0026317 A1 | 2/2007 | Mitchell et al. |
| 2007/0122698 A1 | 5/2007 | Mitchell et al. |
| 2007/0177334 A1 | 8/2007 | Thrap |
| 2007/0184711 A1 | 8/2007 | Thrap et al. |
| 2007/0190424 A1 | 8/2007 | Mitchell et al. |
| 2008/0016664 A1 | 1/2008 | Mitchell |
| 2008/0092808 A1 | 4/2008 | Mitchell et al. |
| 2008/0102371 A1 | 5/2008 | Mitchell et al. |
| 2008/0117564 A1 | 5/2008 | Zhong et al. |
| 2008/0117565 A1 | 5/2008 | Zhong et al. |
| 2008/0206446 A1 | 8/2008 | Mitchell |
| 2008/0236742 A1 | 10/2008 | Mitchell |

FOREIGN PATENT DOCUMENTS

| | | |
|---|---|---|
| EP | 1009058 | 6/2000 |
| EP | 1126536 | 8/2001 |
| JP | 01241811 | 9/1989 |
| JP | 04-067610 | 3/1992 |
| JP | 04-088619 | 3/1992 |
| JP | 05-129020 | 5/1993 |
| JP | 08-096810 | 4/1996 |
| JP | 09-183604 | 7/1997 |
| JP | 2000-200737 | 7/2000 |
| WO | 2006018747 A1 | 1/2006 |
| WO | 2006135495 A1 | 12/2006 |

* cited by examiner

METHOD OF MANUFACTURING AN ELECTRODE OR CAPACITOR PRODUCT

RELATED APPLICATIONS

The present application is a divisional of U.S. application Ser. No. 10/900,824, filed Jul. 28, 2004, entitled "Densification of Compressible Layers During Electrode Lamination," which issued as U.S. Pat. No. 7,384,433, on Jun. 10, 2008, and which claims the benefit of commonly assigned Provisional Application No. 60/578,722, filed Jun. 10, 2004; commonly assigned Provisional Application No. 60/557,576, filed Mar. 30, 2004; commonly assigned Provisional Application No. 60/546,093, filed Feb. 19, 2004. Each of these nonprovisional and provisional applications is incorporated herein by reference in its entirety.

FIELD OF THE INVENTION

The present invention relates generally to methods for increasing density to ductile layers, methods for laminating ductile layers to layers of less yielding materials, and to composite structures, such as electrodes of electrical energy storage devices, fabricated using such methods.

BACKGROUND

Manufacture of many articles involves attachment of a relatively pliable layer to a relatively rigid layer. Electrodes constitute on class of such articles.

Electrodes are widely used in many devices that store electrical energy, including primary (non-rechargeable) battery cells, secondary battery cells, fuel cells, and capacitors. Because of various competing performance criteria that need to be considered when designing electrodes, many electrodes are constructed using two or even more constituent materials. One application where such composite electrodes are often used is construction of double layer capacitors, also known as electrochemical capacitors, supercapacitors, and ultracapacitors.

Double layer capacitors employ, as their energy storage elements, electrodes immersed in an electrolytic solution (electrolyte). Typically, a porous separator impregnated with the electrolyte ensures that the electrodes do not come in contact with each other. A double layer of charges is formed at each interface between the solid electrodes and the electrolyte. Double layer capacitors owe their descriptive name to these layers.

In comparison to conventional capacitors, double layer capacitors have high capacitance in relation to their volume and weight. There are two main reasons for this volumetric and weight efficiency. First, the width of the charge separation layers is very small, on the order of nanometers. Second, the electrodes can be made from a porous material, having very large effective area per unit volume, i.e., very large normalized effective surface area. Because capacitance is directly proportional to the electrode area, and inversely proportional to the width of the charge separation layer, the combined effect of the narrow charge separation layer and large surface area results in capacitance that is very high in comparison to that of conventional capacitors. High capacitance enables double layer capacitors to receive, store, and release large supplies of electrical energy.

Another important performance parameter of a capacitor is its internal resistance, also known as equivalent series resistance (ESR). Frequency response of a capacitor depends on the characteristic time constant of the capacitor, which is essentially a product of the capacitance and the internal resistance, or RC. To put it differently, internal resistance limits both charge and discharge rates of a capacitor, because the resistance limits the current that flows into or out of the capacitor. Maximizing the charge and discharge rates is important in many applications. In hybrid automotive applications, for example, a capacitor used as the energy storage element powering a vehicle's engine has to be able to provide high instantaneous power during acceleration, and to receive power produced by regenerative braking.

High internal resistance may create heat during both charge and discharge cycles. Heat causes mechanical stresses and speeds up various chemical reactions, thereby accelerating capacitor aging. Moreover, the energy converted into heat is lost, decreasing the efficiency of the capacitor. It is therefore desirable to reduce internal resistance of capacitors.

Active materials used for electrode construction—activated carbon, for example—usually have rather limited specific conductance. Thus, large contact area may be desired to minimize the contact resistance between the electrode and its terminal. The active material may also be too brittle or otherwise unsuitable for directly connecting to terminals. Additionally, the material may have relatively low tensile strength, needing mechanical support in some applications. For these reasons, electrodes typically incorporate current collectors.

A current collector is typically a sheet of conductive material on which the active electrode material is deposited. Aluminum foil is commonly used as the current collector material of an electrode. In one electrode fabrication process, a solvent based electrode film is produced, and then attached to a thin aluminum foil using a wet solvent based adhesive or binder layer. To improve the quality of the interfacial bond between the film of active electrode material and the current collector, the combination of the film and the current collector is processed in a pressure laminator, for example, a calender or another nip. Pressure lamination increases the bonding forces between the film and the current collector, and reduces the equivalent series resistance. After laminating the combination of solvent based electrode film, wet adhesive binder, and current collector are subsequently dried to remove any liquid solvent, lubricants, or impurities.

As has already been mentioned, high capacitances of double layer capacitors result, to a great extent, from the high normalized effective surface area of the active electrode layers. Porosity of the active electrode layer film plays an important role in increasing the effective surface area. Generally, porosity on a small scale level is unchanged when the active electrode film is densified through compaction, for example, through calendering or processing in another kind of high-pressure nip. Because compacting reduces the film's volume while keeping pore surfaces relatively unchanged, the normalized effective surface area is increased. Furthermore, compacting tends to decrease the equivalent series resistance, and possibly also improves structural integrity of the film. For these reasons, current solvent based active electrode films are often compacted before they are attached to current collectors.

The material of a typical active electrode film is compressible and malleable. When the film is processed in a calender, alone, or onto a wet adhesive binder layer, it tends not only to densify through compaction in the direction of pressure application, but also to deform, elongating and widening in the plane transverse to this direction. This is problematic for two reasons. First, densification is reduced, potentially requiring multiple compaction/densification steps. Second, the film may need to be trimmed because of spreading, i.e., because of the elongation and widening. Trimming becomes necessary, for example, when the film spreads beyond the current collector surface, or when the film spreads to the areas of the current collector that need to be connected to other components, such as terminals or other electrodes. The additional compacting and trimming steps increase processing costs and time, and are best reduced or avoided altogether. These problems are not necessarily limited to electrode fabrication, but may be relevant when densifying and laminating other compressible materials.

SUMMARY

A need thus exists for methods of densifying ductile layers using a reduced number of compacting steps. Another need exists for methods that reduce elongation and widening of the layers during compacting or during other high-pressure procedures. A further need exists for electrodes fabricated using such methods. Still another need exists for energy storage devices, such as double layer capacitors, using these electrodes.

The present invention is directed to methods, electrodes, and energy storage devices that satisfy these needs. An exemplary embodiment of the invention herein disclosed is a method of manufacturing an electrode. According to the method, a current collector and a film of active electrode material are provided and stacked so that a first surface of the current collector is in contact with the film. The resulting stack is then laminated by pressing the current collector and the film to cause the film to densify and to adhere to the first surface of the current collector, thereby obtaining a laminated electrode product. Lamination is performed so that the film is densified without spreading to an extent necessitating trimming. For example, in some embodiments the film does not spread beyond the current collector or an adhesion layer disposed on the current collector.

In various embodiments, the current collector is made from a material that does not stretch significantly, for example, from aluminum foil. Friction between the current collector and the film helps to prevent spreading of the film during lamination. The friction can be increased in a variety of ways, for example, by mechanically roughening or chemically pitting the current collector, or subjecting the current collector to a surface activation treatment.

In various embodiments, the current collector is coated with a conduction-promoting binder. In one embodiment, the binder is dried before the current collector and the film are brought into contact with each other.

Reduced spreading of the film improves densification of the film achieved during lamination. A single pass through a laminator can thus achieve specified densification, eliminating the need for additional compaction or other densification steps.

The film can be fabricated using various techniques, for example, by fibrillizing a mixture of active electrode material, a polymer, and a conduction promoter.

In various embodiments, lamination is performed by passing the film and the current collector between rolls of a laminator. The laminator is set to provide a known pressure between the rolls. In some embodiments, the rolls are heated.

In one embodiment, a method of manufacturing an electrode product comprises steps of providing a current collector comprising a first surface; providing a film of active electrode material; stacking the film and the current collector so that the first surface is in contact with the film; and laminating the current collector and the film by pressing the current collector and the film to cause the film to densify and to adhere to the first surface, thereby obtaining a laminated electrode product; wherein the step of laminating is performed so that the film is densified without spreading to an extent necessitating trimming of the film after laminating. The step of providing a current collector may comprise providing the current collector with a dried layer of adhesive material. The step of providing a current collector may comprise providing the current collector comprising a material that causes the current collector to be capable of stretching to a lesser degree than the film. The step of laminating may consist of a single pass through a laminator. The step of lamination may be performed so as not to cause the film to spread beyond the current collector. The step of providing the film may comprise mixing particles of active electrode material with a polymer and a conduction promoter to form a dry powder material; and fibrillizing the dry powder material using a dry high-shear technique. The product may comprise a double-layer capacitor. The step of lamination may comprise processing the film and the current collector between rolls of a laminator. The step of processing may comprise heating surface of at least one of the laminator rolls. The step of processing may comprise heating surface of at least one of the laminator rolls to a temperature between about 100 degrees Celsius and about 300 degrees Celsius. The film and the current collector may pass between a first laminator roll and a second laminator roll; and the step of processing may comprise setting a gap between the first laminator roll and the second laminator roll so that thickness of the film is reduced by between about 30 and about 70 percent, the step of setting a gap being performed before the film and the current collector pass between the first and second laminator rolls. The laminated electrode product may be cooled. The step of cooling may comprise S-wrapping the laminated electrode product on a pair of chilling rolls and cooling the chilling rolls using a liquid with a temperature of between about 18 and about 22 degrees Celsius. The rolls of the laminator may apply pressure of between about 50 and about 1000 pounds per linear inch of width of the film to the current collector and the film. The rolls of the laminator may apply pressure of between about 350 and about 650 pounds per linear inch of width of the film to the current collector and the film. The rolls of the laminator may apply pressure of about 500 pounds per linear inch of width of the film to the current collector and the film.

In one embodiment, a method of manufacturing an electrode product may comprise providing a current collector comprising a first surface and a second surface; coating the first surface with a first wet binder layer; drying the first wet binder layer to result in a first dry binder layer coating the first surface; providing a first film of active electrode material; stacking the first film and the current collector so that the first dry binder layer is in contact with the first film; and laminating the current collector and the first film by pressing the current collector and the first film to cause the first film to densify and to adhere to the first surface, thereby obtaining a laminated electrode product. The step of laminating may be performed so that the first film is densified without spreading to an extent necessitating trimming. The method of manufacturing may further comprise coating the second surface with a second wet binder layer; drying the second wet binder layer to result in a second dry binder layer coating the second surface; providing a second film of active electrode material; and stacking the second film and the current collector so that the second dry binder layer is in contact with the second film; wherein the step of laminating further comprises pressing the second film and the current collector to cause the second film to adhere to the second surface, and the second film to be densified without spreading to an extent necessitating trimming. The step of providing a current collector may comprise providing the current collector comprising a material that does not stretch significantly. The step of providing a current collector may comprise providing the current collector comprising a material that causes the current collector to be capable of stretching to a lesser degree than the first film. The step of providing a current collector may comprise providing the current collector comprising a metal. The step of providing a current collector may comprise providing a metal foil. Laminating may consist of a single pass through a laminator. The first and second films are not separately densified. The step of lamination does not cause the first and second films to spread beyond the current collector. The step of providing the first film may comprise mixing particles of active electrode material with a polymer and a conduction promoter to form a dry powder material; and fibrillizing the dry powder material using a dry high-shear technique. The step of lamination may comprise heating the first film and the second film. The step of lamination may comprise processing the first film, the second film, and the current collector between rolls of a laminator. The step of processing may comprise heating surface of at least one of the laminator rolls. The first binder layer and the second binder layer may comprise a thermoplastic; and the step of processing may comprise heating surfaces of at least one of the laminator rolls to a temperature sufficient to melt the thermoplastic of the first and second binder layers but insufficient to decompose the thermoplastic of the first and second binder layers. The step of processing may comprise heating surfaces of at least two of the laminator rolls to a temperature between about 100 degrees Celsius and about 300 degrees Celsius. The first film, the second film, and the current collector may pass between a first laminator roll and a second laminator roll; and the step of processing further may comprise setting a gap between the first laminator roll and the second laminator roll so that combined thickness of the current collector, the first and second films, and the first and second binder layers is reduced by between about 30 and about 70 percent, the step of setting a gap being performed before the film and the current collector pass between the first and second laminator rolls. The rolls of the laminator may apply pressure of between about 50 and about 1000 pounds per linear inch to the current collector and the first and second films. The method of may further comprise a step of winding the laminated current collector on a roll.

In one embodiment, a method of manufacturing a capacitor product comprises providing a current collector comprising a first surface; providing an adhesive onto the first surface; and drying the wet adhesive to form a dried adhesive on the current collector. After the step of drying the adhesive, the current collector may be rolled onto a storage roll. After the step of drying an electrode film is calendered onto the dried adhesive. The electrode film may comprise a dry fibrillized blend of carbon and binder particles.

In one embodiment, an energy storage device product comprises a collector; and a dry adhesive adhered on the collector. The product further may comprise a storage roll and the collector and dried adhesive are rolled onto the storage roll. The product further may comprise an electrode film and the electrode film is adhered to the collector by the dried adhesive. The electrode film may be formed of a plurality of dry fibrillized particles. The electrode film may be formed from an extruded slurry. The electrode film and the dried adhesive may be densified together. The collector may comprise an aluminum. The product may be a capacitor. The product may be a double-layer capacitor. The electrode film may comprise a length, a width, and a thickness, wherein when placed against the dry adhesive the electrode film is constrained by the dried adhesive such that when a force is applied to the electrode film perpendicular to the length and width of the film the electrode film substantially maintains its width and length.

These and other features and aspects of the present invention will be better understood with reference to the following description, drawings, and appended claims.

DETAILED DESCRIPTION

Reference will now be made in detail to several embodiments of the invention that are illustrated in the accompanying drawings. Wherever possible, same or similar reference numerals are used in the drawings and the description to refer to the same or like parts or steps. The drawings are in simplified form and not to precise scale. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner. The words binder and adhesive are used interchangeably within the description, unless the difference is noted or made otherwise clear from the context. The expression "active electrode material" and similar phrases signify material that enhances the function of the electrode beyond simply providing a contact or reactive area approximately the size of the visible external surface of the electrode. In a double layer capacitor electrode, for example, a film of active electrode material includes particles with high porosity, so that the surface area of the electrode exposed to an electrolyte in which the electrode is immersed, is increased well beyond the area of the visible external surface; in effect, the surface area exposed to the electrolyte becomes a function of the volume of the film made from the active electrode material.

Figure 1:
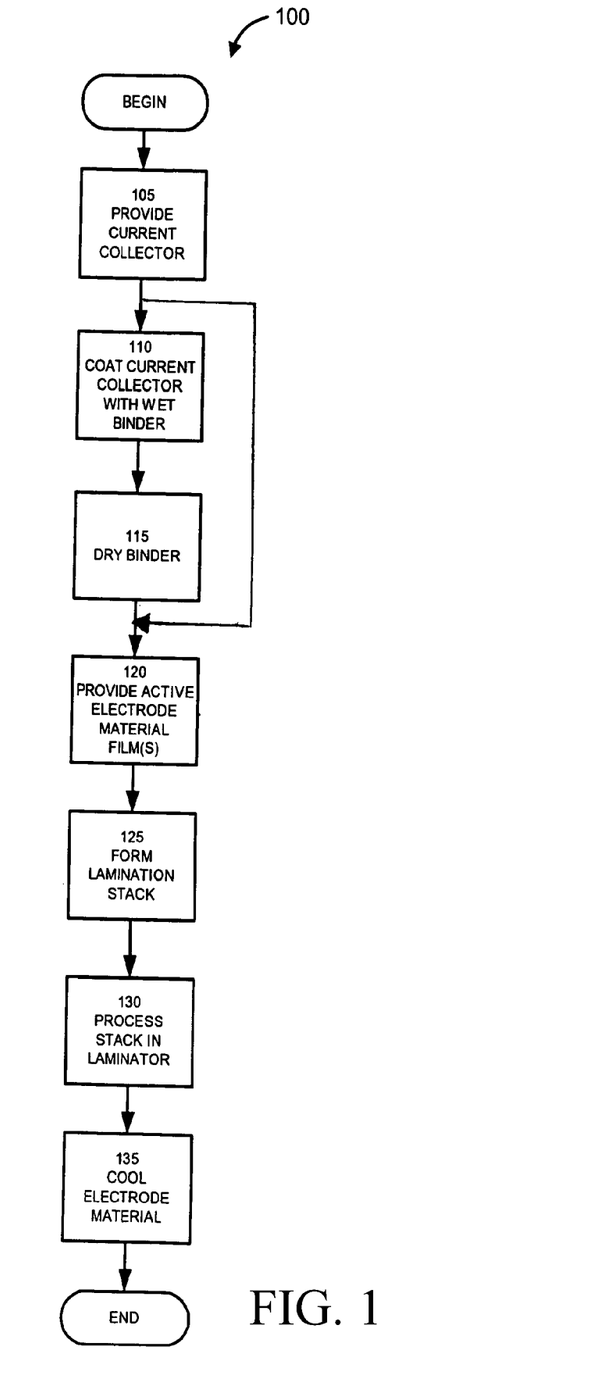
FIG. 1 illustrates selected steps of a process of manufacturing an electrode of a double layer capacitor, in accordance with an embodiment of the present invention.

Referring more particularly to the drawings, FIG. 1 illustrates selected steps of a process 100 of manufacturing an electrode of a double layer capacitor. Not all illustrated steps are strictly necessary, and other steps can be added to the process 100. A high level overview of the process 100 is provided immediately below; more detailed explanations of the steps of the process 100 and variations of the steps are provided at later points in this document.

At step 105, a current collector foil is provided. At step 120, one or more films of active electrode material are provided.

In one embodiment, a single active electrode film is placed on the side of the current collector that is covered with a dried conduction-promoting adhesive. Accordingly, in one embodiment, at step 110, the current collector foil is coated with a wet layer of conduction-promoting adhesive. As will be discussed below, the current collector can be coated on two sides. Wet adhesive coating of the second side can be performed as part of the step 110, or as a separate step substantially similar to step 110. (The separate coating step is not illustrated in FIG. 1.) At step 115, the wet adhesive layer is dried. In one embodiment, after drying, the current collector foil may be rolled or otherwise stored until needed for the following steps of the process 100. In other embodiments, the current collector is coated on two sides, and films of active electrode material are placed on each of the coated sides.

At step 125, a lamination stack is formed from the current collector and the one or more active electrode films and/or dry adhesive layer.

At step 130, the stack is processed in a laminator, a device similar to a calender or another high-pressure nip. As a result of this step, the film or films of the active electrode material are bonded to the current collector. At the same time, the active electrode material of the film(s) is densified under the pressure applied by the lamination device. A bonded electrode product is available after processing in the laminator. The bonded electrode product may be cooled in a step 135.

We now turn to the description of the individual steps of the process 100.

In one embodiment, the current collector provided in step 105 is made from a material that does not stretch significantly. Cohesive forces that arise between an applied active electrode film and the current collector surface preferably restrict deformation of the film in the plane parallel to the current collector. It is identified that because the tendency to spread in the plane of the collector is limited by adhesion to the current collector, densification of an active electrode material film is enhanced. In other words, when compared to the prior art use of a wet adhesive layer, wherein the wet adhesive layer has a tendency to spread when subject to lamination type forces, spreading of the film applied in step 120 is substantially reduced or avoided altogether when applied to a collector as described herein.

The current collector can take various forms and be made of different materials. In one electrode embodiment, the current collector is a sheet of aluminum foil approximately 40 microns thick. In alternative embodiments in accordance with the present invention, the thickness of the foil is between about 20 and about 100 microns; in other, more specific embodiments, the thickness of the aluminum foil is between about 30 and about 50 microns. Conductive materials other than aluminum can also be used for the current collector. These materials include, for example, silver, copper, gold, platinum, palladium, steel, and tantalum, as well as various alloys of these metals.

In some electrode embodiments, the surface of the current collector is uneven and rough. Surface unevenness can be achieved, for example, by mechanical roughing, or chemical pitting. The current collector can also be subjected to a surface activation treatment using, for example, corona discharge, active plasma, ultraviolet, laser, or high frequency treatment methods known to a person skilled in the appropriate art. The activation treatment tends to promote adhesion between the current collector and the active electrode film adjacent to it. Indeed, in some electrode embodiments in accordance with the invention, the surface activation treatment also performs the function of roughing the film surface, or is applied instead of roughing the surface. Furthermore, in some embodiments, cohesive forces between the current collector and the film of the active electrode material are sufficient to bond the two components together and substantially to prevent spreading of the film with respect to the current collector, even in the absence of the binder layer interposed between the two components.

In one embodiment, rather than calandering an electrode directly to a collector, the electrode is calandered to a dried adhesive disposed on the collector. A wet adhesive coating applied to the current collector in step 110 can be obtained by dissolving a binder in a processing additive, such as organic solvent, aqueous solvent, or a blend of aqueous and organic solvents. In some electrode embodiments, an electrical conduction enhancer may be added to the binder solution. The resulting solution typically has a slurry-like composition. The wet slurry may be coated onto the current collector through a doctor blade or a slot die. The slurry can also be sprayed onto the current collector, or applied using other techniques known to a person skilled in the relevant art.

In certain exemplary electrode embodiments, the solvents used to produce the wet adhesive coating include water, isopropyl alcohol (IPA), and ammonia solutions; the conduction enhancer includes graphite or conductive carbon powder; and the binder includes a thermoplastic powder material.

In various electrode manufacturing process embodiments, the proportions (by weight) of the constituent components of the wet adhesive are as follows: between 5 and 20 percent of conductive carbon, between 7 and 40 percent of thermoplastic, and between 40 and 85 percent of solvent. In more specific process embodiments, the proportions are as follows: 7-11 percent of conductive carbon, 12-25 percent of thermoplastic, and 65-80 percent of solvent. In a still more specific process embodiment, the proportions are: about 10 percent graphite, 20 percent thermoplastic, and 70 percent binder. Another embodiment uses adhesive coating known by trade name Electrodag® EB-012, available from Acheson Colloids Company, 1600 Washington Avenue, Port Huron, Mich. 48060; telephone number (810) 984-5581; www.achesonindustries.com. The Electrodag® EB-012 is a water-based dispersion of graphite in a thermoplastic binder.

The thickness of the binder layer applied to the current collector can vary widely. In one embodiment, the thickness of the binder layer is between about 20 and 30 microns when wet.

Turning now to step 115, the wet adhesive coating can be air-dried at about room temperature to remove the solvent. Alternatively, the wet adhesive coating can be force-dried. In the case of Electrodag® EB-012, the manufacturer recommends air-drying at room temperature for 24 hours, or force-drying between 3 and 10 minutes at a temperature between 70 and 90 degrees Celsius (between 158 and 203 degrees Fahrenheit). The minimum durations of the drying process may depend not only on the ambient or drying agent temperature, but also on the relative humidity of the air and the thickness of the applied coating. Force-drying is often employed to speed up the manufacturing process and achieve a more uniform, homogeneous dry binder layer.

Because of the loss of solvent in the course of the drying step 115, the thickness of the dried binder layer decreases in comparison to its thickness in the wet state. In one exemplary embodiment that uses Electrodag® EB-012, the thickness decreases from about 20-30 microns to about 10 microns. Although not shown in FIG. 1, in one embodiment, after drying the current collector and adhesive, the coated collector may be rolled onto a storage roll for later use.

We now proceed to discuss step 120, i.e., providing the active electrode material film. One way to manufacture the film is by using a solvent based extrusion processes known to those skilled in the art. The polymers used in electrode embodiments in accordance with the present invention include, without limitation, polytetraflouroethylene (PTFE or Teflon®), polypropylene, polyethylene, co-polymers, and various polymer blends. The polymers act as a matrix for the active electrode material within the film. To form the film, powders of the polymer, the active electrode material, and possibly other powder materials are blended. The resulting compound is introduced, together with a solvent, into an extruder to fibrillate the blended material, creating a dough-like film. In one embodiment, the proportions of the powder compound and the solvent are about 80/20 by weight. The dough-like film may be calendered one or more times to produce the film of active electrode material having desired thickness and density. The number of separate calendaring steps can be reduced, or separate calendaring steps can be eliminated altogether, using processes in accordance with the present invention.

According to another technique for manufacturing the film of active electrode material, particles of the active electrode material (activated carbon) are blended or otherwise dry mixed together with a polymer and a conduction promoter (conductive carbon) to form a dry powder material. In one exemplary embodiment, the powders and proportions used are as follows: 85-90 percent by weight of activated carbon (the active electrode material), 5-8 percent by weight of polymer, and 2-10 percent by weight of conductive carbon (graphite, acting as a promoter of electrical conduction). Another exemplary embodiment contains 85-93 percent of activated carbon, 3-8 percent of polymer, and 2-10 percent of conductive carbon. Suitable activated carbon powders are available from a variety of sources, including Nuchar® powders sold by Westvaco Corporation of Stamford, Conn. In one embodiment, the polymer comprises fibrillizable Teflon or PTFE. Yet another exemplary embodiment contains activated carbon and PTFE, and does not use conductive carbon. In one embodiment, the dry mixed powder material is fibrillized using a dry non-lubricated high-shear technique. In one embodiment, the dry shearing forces are applied in a jet mill, wherein high pressure air is applied to the dry mixed powder to cause the powder to impact against a surface, thus causing the polymer in the mix to shear. The shear forces that arise during a dry fibrillation process physically stretch the polymer particles, causing the polymer to form a network of fibers that bind the polymer to the conduction promoter and to the active particles, e.g., to the graphite and activated carbon particles. The fibrillized material may then be fed into one or more high-pressure nips to form an electrode film, such as roll mills, calendars, belt-presses, or flat plate presses. When a dry electrode process as described above is used, the number of high-pressure processing steps can be reduced, or such steps can be eliminated altogether. Because no solvents or liquids are used in formation of the electrode film using a dry fibrillization technique as described above, the resulting electrode film self supporting and substantially free of any impurities that can be introduced or left behind by such additives and, thus, is not subject to degradation caused by such impurities that can reduce the film's lifetime. Because electrode film made according to the above dry process is dry, when laminated it does not spread as much as a solvent based or wet electrode film and, furthermore, because the film is self supporting it is readily adaptable for use in a calendar. The tendency of a dry electrode film not to spread when used in combination with a bare collector or a collector coated with a dried adhesive enables a densified electrode structure that resists deformation in the width and length of the collector.

Dry processes for manufacturing self supporting solvent and additive free active electrode films are discussed in more detail in the following commonly assigned U.S. patent application: entitled DRY PARTICLE BASED ELECTROCHEMICAL DEVICE AND METHODS OF MAKING SAME, Ser. No. 10/817,701, which is hereby incorporated by reference as if fully set forth herein.

Figure 2:
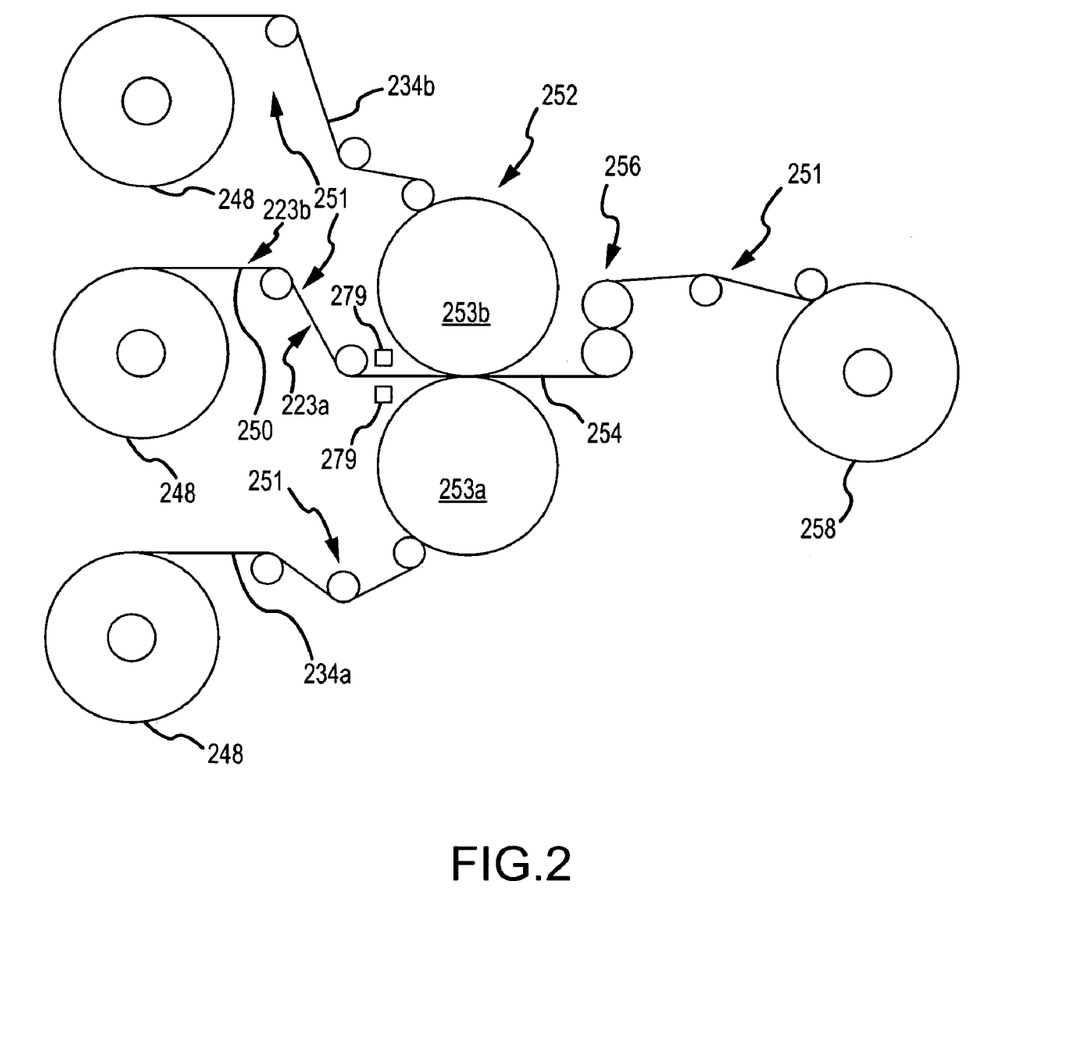
FIG. 2 illustrates stacking and lamination steps of the process of FIG. 1.

FIG. 2 illustrates in more detail the stacking, lamination, and cooling steps 125/130/135. In one embodiment, a current collector 250 and two active electrode films 234a and 234b are fed from storage rolls 248 into a laminator 252 so that the current collector 250 is positioned between the two films 234a and 234b. Tension control elements 251 can also be employed in one or more locations of the system in FIG. 2. As previously described herein, in one embodiment, the current collector 250 may be a bare collector, and in one embodiment, the current collector may comprise dried binder layers 223a and 223b. In one embodiment, the laminator 252 includes heated rolls 253a and 253b, each having a diameter of about six inches and working surface (width) of about 13 inches. The rolls 253 rotate so that the films 234 and the current collector 250 are processed at the rate of between about 12 and 120 inches per minute. In one embodiment, the rolls 253 are heated in order to soften the and the electrode films and/or, if used, dry binder layers 223, such that good adhesion of the films 234 to the current collector 250 is effectuated.

In one embodiment, the surface temperature of the rolls 253 at the nip of the laminator 252 is between 100 and 300 degrees Celsius (212 and 572 degrees Fahrenheit). In a more specific embodiment, the surface temperature of the rolls 253 is between 150 and 250 degrees Celsius (302 and 482 degrees Fahrenheit). In a still more specific embodiment, the surface temperature of the rolls is set between 195 and 205 degrees Celsius (383 and 401 degrees Fahrenheit). In one embodiment, the surface temperature of the rolls 253 is selected so as to melt the thermoplastic (or other resin) of the binder layers 223, but avoid decomposition of the thermoplastic (or of other resin).

To assist in heating, the apparatus illustrated in FIG. 2 may also include heaters 279 positioned in front of the rolls 253.

Each film 234 becomes calendared and bonded to a side of the current collector 250, resulting in an electrode product 254 exiting the laminator 252. In one embodiment, the electrode 254 is S-wrapped over chill rolls 256 to set the film 234 onto the current collector 250 and controllably cool the electrode product 254. In this embodiment, the chill rolls 256 are cooled by internal liquid coolant with temperature of about 18 to 22 degrees Celsius (about 64 to 72 degrees Fahrenheit). In a more specific embodiment, the temperature of the liquid coolant is between about 20 and 21 degrees Celsius (68 to 70 degrees Fahrenheit).

In one embodiment, the nip pressure is set in the range between 50 and 1000 pounds per linear inch (PLI) of the width of the films 234. In a more specific embodiment, the nip pressure is set in the range between 350 and 650 PLI. In a still more specific embodiment, the nip pressure is set between 450 and 550 PLI. In a particular embodiment, the nip pressure is set to about 500 PLI.

In various electrode embodiments, the pre-lamination thickness of each layer 234 is between 80 and 500 microns. In more specific embodiments, the pre-lamination thickness is between about 100 and 200 microns.

In one embodiment, the gap between the laminator rolls 253a and 253b is set to between 30 and 45 percent of the stack thickness, i.e., of the combined thicknesses of the films 234a/b, the current collector 250, and if used the dry binder layers 223a/b. In a more specific embodiment, the laminator gap is set to between 35 and 40 percent of the stack thickness.

In one embodiment, the laminator pressure and gap settings are selected so as to obtain (1) a good bond between the films 234 and the current collector 250, (2) sufficient densification of the films 234, and, at the same time, (3) so as not to cause spreading of the films 234 beyond the boundary of the dried coated and dried binder layer on the current collector 250, or spreading that would otherwise require subsequent trimming. In some embodiments, a single pass through the laminator 252 is sufficient to obtain the needed bonding and densification effects. Note, however, that the laminator used can have multiple sets of rolls 253. For example, the laminator can cave three sets of rolls that sequentially process the films 234 and the current collector 250.

In some embodiments, densification of the films 234 results in the reduction of the thickness of each of the films 234 by between 30 and 70 percent. (It should be noted that after processing in the laminator 252, the stack thickness rebounds to some extent; thickness reduction discussed here is reduction after the rebound.) In more specific embodiments, the thickness reduction is between 35 and 60 percent. In yet more specific embodiments, the thickness reduction is between about 40 and 50 percent. Because thicknesses of the current collector and the binder layers are typically much smaller than the thickness of each film, the percentage reduction in the combined stack thickness in these embodiments is about the same as the percentage reduction in the thickness of the films.

In one embodiment, wherein an extrusion solvent based electrode layer is adhered and/or calendared to a dry adhesive disposed on a collector, a subsequent drying step to remove the solvent would be utilized after the adhesion step to remove solvents from the solvent based electrode layer. Those skilled in the art would identify that such a secondary drying step would not necessarily be needed if an electrode layer made by the dry fibrillization process previously referenced was used.

A calendared electrode 254 can be collected onto a storage roll 258 or other similar storage device. The resulting product can subsequently be provided for use in manufacture of an energy storage device, for example, as an electrode in a double-layer capacitor.

This document describes the inventive electrodes and processes used in the course of their fabrication in considerable detail. This was done for illustration purposes only. Neither the specific embodiments of the invention as a whole, nor those of its features, limit the general principles underlying the invention. In particular, the invention is not limited to the specific materials used for fabricating the electrodes; and pressure-bonding of the inventive electrodes is not limited to the use of calendars, but includes various other pressure devices. The invention is also not limited to electrodes used in double layer capacitors, but extends to other electrode applications and to applications in other technological areas where densification and lamination of a compressible/malleable layer without significant spreading is needed. The specific features described herein may be used in some embodiments, but not in others, without departure from the spirit and scope of the invention as set forth. Many additional modifications are intended in the foregoing disclosure, and it will be appreciated by those of ordinary skill in the art that, in some instances, some features of the invention will be employed in the absence of a corresponding use of other features. The illustrative examples therefore do not define the metes and bounds of the invention and the legal protection afforded the invention, which function is served by the claims and their legal equivalents.

What is claimed is:

1. A method of manufacturing an electrode product, the method comprising:
    providing a current collector comprising a first surface and a second surface; coating the first surface with a first wet binder layer;
    drying the first wet binder layer to result in a first dry binder layer coating the first surface;
    providing a first film of active electrode material;
    stacking the first film and the current collector so that the first dry binder layer is in contact with the first film; and
    laminating the current collector and the first film by pressing the current collector and the first film to cause the first film to densify and to adhere to the first surface, thereby obtaining a laminated electrode product.

2. A method of manufacturing an electrode according to claim 1, wherein the step of laminating is performed so that the first film is densified without spreading to an extent necessitating trimming.

3. A method of manufacturing an electrode according to claim 2, further comprising:
    coating the second surface with a second wet binder layer;
    drying the second wet binder layer to result in a second dry binder layer coating the second surface;
    providing a second film of active electrode material; and
    stacking the second film and the current collector so that the second dry binder layer is in contact with the second film;
    wherein the step of laminating further comprises pressing the second film and the current collector to cause the second film to adhere to the second surface, and the second film to be densified without spreading to an extent necessitating trimming.

4. A method of manufacturing an electrode according to claim 3, wherein the step of providing a current collector comprises providing the current collector comprising a material that causes the current collector to be capable of stretching to a lesser degree than the first film.

5. A method of manufacturing an electrode according to claim 3, wherein the step of providing a current collector comprises providing a metal.

6. A method of manufacturing an electrode according to claim 3, wherein the step of providing a current collector comprises providing a metal foil.

7. A method of manufacturing an electrode according to claim 6, wherein laminating consists of a single pass through a laminator.

8. A method of manufacturing an electrode according to claim 6, wherein the first and second films are not separately densified.

9. A method of manufacturing an electrode according to claim 6, wherein the step of lamination does not cause the first and second films to spread beyond the current collector.

10. A method of manufacturing an electrode according to claim 6, wherein the step of providing the first film comprises: mixing particles of active electrode material with a polymer and a conduction promoter to form a dry powder material; and fibrillizing the dry powder material using a dry high-shear technique.

11. A method of manufacturing an electrode according to claim 6, wherein the step of lamination comprises heating the first film and the second film.

12. A method of manufacturing an electrode according to claim 6, wherein the step of lamination comprises processing the first film, the second film, and the current collector between rolls of a laminator.

13. A method of manufacturing an electrode according to claim 12, wherein the step of processing comprises heating surface of at least one of the laminator rolls.

14. A method of manufacturing an electrode according to claim 12, wherein: the first binder layer and the second binder layer comprise a thermoplastic; and the step of processing comprises heating surfaces of at least one of the laminator rolls to a temperature sufficient to melt the thermoplastic of the first and second binder layers but insufficient to decompose the thermoplastic of the first and second binder layers.

15. A method of manufacturing an electrode according to claim 14, wherein:
    the first film, the second film, and the current collector pass between a first laminator roll and a second laminator roll; and the step of processing further comprises setting a gap between the first laminator roll and the second laminator roll so that combined thickness of the current collector, the first and second films, and the first and second binder layers is reduced by between about 30 and about 70 percent, the step of setting a gap being performed before the film and the current collector pass between the first and second laminator rolls.

16. A method of manufacturing an electrode according to claim 12, wherein the step of processing comprises heating surfaces of at least two of the laminator rolls to a temperature between about 100 degrees Celsius and about 300 degrees Celsius.

17. A method of manufacturing an electrode according to claim 16, wherein the step of providing a current collector comprises providing a material that does not stretch significantly.

18. A method of manufacturing an electrode according to claim 12, wherein the rolls of the laminator apply pressure of between about 50 and about 1000 pounds per linear inch to the current collector and the first and second films.

19. A method of claim 1, further comprising a step of winding the laminated current collector on a roll.

20. A method of manufacturing a capacitor product, the method comprising:
    providing a current collector comprising a first surface;
    providing an adhesive onto the first surface; and
    drying the adhesive to form a dried adhesive on the current collector,
    wherein after the step of drying the adhesive, the current collector is rolled onto a storage roll.

\* \* \* \* \*